(No Model.)
A. C. BULL.
CAKE OR PUDDING STIRRER.
No. 502,066. Patented July 25, 1893.
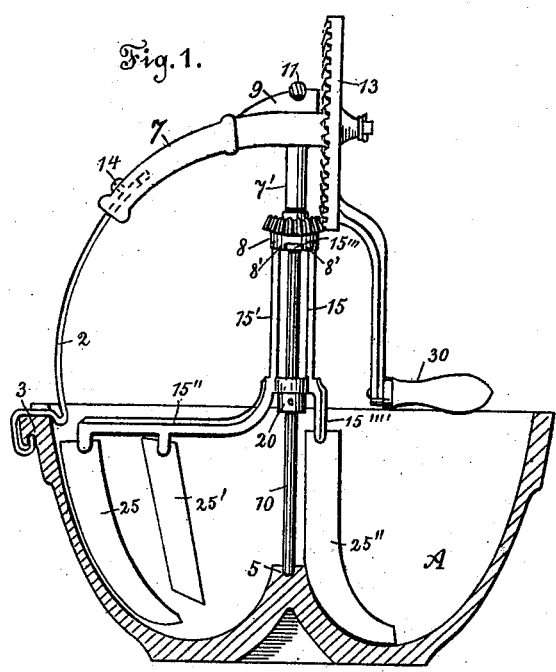
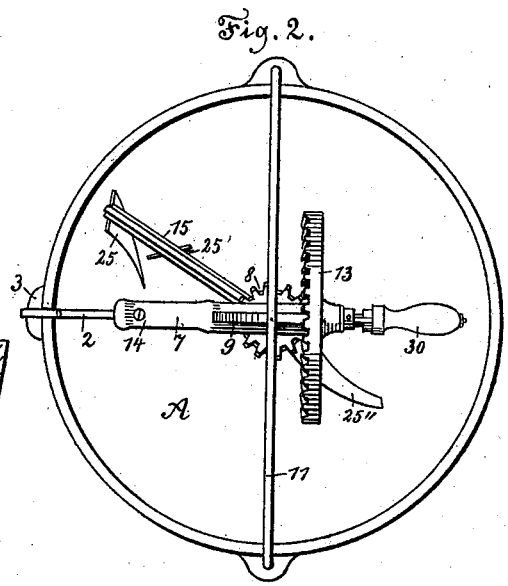
Witnesses:
Chas. Raabe
R. N. McCormick
Inventor:
Annabell C. Bull,
by W. V. Tefft,
Attorney.

UNITED STATES PATENT OFFICE.

ANNABELL C. BULL, OF PEORIA, ILLINOIS.

CAKE OR PUDDING STIRRER.

SPECIFICATION forming part of Letters Patent No. 502,066, dated July 25, 1893.

Application filed May 31, 1892. Serial No. 434,844. (No model.)

*To all whom it may concern:*

Be it known that I, ANNABELL C. BULL, a citizen of the United States, residing at Peoria, in the county of Peoria and State of Illinois, have invented certain new and useful Improvements in Cake or Pudding Stirrers; and I do hereby declare that the following is a full, clear, and exact description of the invention, which will enable others skilled in the art to which it appertains to make and use the same.

My invention relates to certain new and useful improvements in cake and pudding stirrers, by means of which a stirrer is provided, being simple in construction, practical and efficient in operation, durable and cheap in first cost.

More particularly my invention relates to a stirring device, purposed to be adjusted within a receptacle, and fixed securely therein, and provided with suitable stirring knives or blades properly mounted and operated through and by means of suitable gear connection with a rotary beveled gear wheel with cogs and crank arm for operating the device.

The essential features of my invention consist principally in the economic construction and arrangement of the various elements which combined form the complete device, and in such construction there is provided a rack carried upon a central post, and having a laterally extending arm and a depending finger to which are secured suitably formed blades depending therefrom, and within the receptacle and of the gear connection as shown, and the adjustable arm for attachment at the side of the receptacle, which together with the bail of the receptacle, hold the stirrer more firmly in place.

That my invention may be more fully understood, reference is had to the accompanying drawings in which—

Figure 1, shows an elevation of my invention adjusted upon a receptacle, the latter being shown in section. Fig. 2 is a plan view of my device adjusted for operation.

In the figures A is a receptacle formed with the lug 3, at its side, and with the raised central bottom portion.

10 is a perpendicular rod, bearing within the depression 5 in the raised central portion of the receptacle A, and integrally connected with the depending sleeve 7' of the frame piece 7.

2 is a hooked rod adjustably connected with the frame piece 7 by means of an opening therein and the set screw 14, and designed to hook over the lug 3, in manner shown.

9 is merely a raised portion from the frame work 7, recessed to receive the bail 11; 15—15' is a rack, formed at its lower portion, with the laterally extending arm 15", and depending finger 15"".

25—25'—25" are blades or knives depending from the laterally extending arm 15" and depending finger 15"".

20 is a collar adjustably secured upon the rod 10, and is designed to support the rack 15—15' and hold the same in desired position. The rack 15—15' is formed at its top portion with extensions as 15'''.

8 is a beveled pinion having the rim attachment thereof provided with depending portions as 8' between which, and within the depressions thus formed, the extensions 15''', of the rack 15—15' are designed to bear to form the connection between the pinion, and rack to obtain a corresponding and simultaneous action or rotation.

13, is a beveled gear wheel, journaled upon an extension from the frame piece 7, and provided with the crank arm to facilitate the rotation of the said disk in the operation of the device.

In operation for the purpose designed, the ingredients desired to be stirred being first placed within the receptacle A, the stirring device being of course adjusted as herein shown by a rotation of the gear wheel 13, through and by means of the crank arm attachment a corresponding rotary motion is imparted to the beveled pinion 8 and by its connection with the rack 15—15', the said rack is turned upon the rod 10, and with it the arm 15" and finger 15"" to which are attached the blades 25—25'—25" as shown. It will be seen from the drawings that the blade 25 is adjusted and formed both to bear near to or scrape the side and lower portion of the receptacle and also to direct the ingredients being mixed toward the center of the receptacle and the knife or blade 25' is also adjusted both to mix and to facilitate the driving of the ingredients toward the circumference of the receptacle and the blade 25'' is adjusted and formed to scrape or bear near to the raised central portion and the middle bottom portion of the receptacle to stir the ingredients completely at the central point and by its curvature to tend to throw the same outward toward the circumference of the receptacle and in contact with the other stirring blades therein adjusted, thus giving in the complete operation of the blades a continuous circulation and perfect mixing of the said ingredients leaving no point within the receptacle that ingredients might remain unmixed or stirred.

Having thus fully described my invention, what I claim, and desire to secure by Letters Patent, is—

1. In a cake and pudding stirrer, the combination with the frame consisting of the vertical rod 10, the angle piece 7, 7' and the flexible arm 2, adapted to engage with a lug on the edge of the vessel in which it is used, of the revoluble rack driven by suitable gearing and the laterally extending arm 15'', having the depending twisted blades 25, 25' and depending finger 15'''', provided with attached curved blade 25'' integral therewith, all substantially as described and set forth.

2. In a cake and pudding stirrer, the combination with the receptacle A, formed with the lug 3, and raised central portion, the stirring device consisting of the blades 25—25'—25'', the rack 15—15' provided with the laterally extending arm 15'', and depending finger 15'''' the blades 25—25'—25'' adjusted thereon, the perpendicular rod 10, bearing within the depression 5 in the raised portion of the receptacle, the beveled pinion 8, carried with the rack 15—15', upon rod 10 the said rod being provided with the collar 20, adjustably connected therewith to hold the rack in position, the frame piece 7 having sleeve 7' and provided with the flexible hooked arm 2, and recessed raised portion 9, and the beveled gear wheel 13, journaled upon a projection from the frame piece 7, and provided with suitable crank arm, all substantially as described and set forth.

In testimony whereof I affix my signature in presence of two witnesses.

ANNABELL C. BULL.

Witnesses:
JOSEPHINE TEFFT,
W. V. TEFFT.